(12) United States Patent
Line et al.

(10) Patent No.: US 9,597,990 B2
(45) Date of Patent: Mar. 21, 2017

(54) INTERNAL MAP POCKET

(71) Applicant: Ford Global Technologies, LLC, Dearborn, MI (US)

(72) Inventors: Johnathan Andrew Line, Northville, MI (US); Marcos Silva Kondrad, Macomb, MI (US); Nicholas Alphonse Billardello, Macomb, MI (US); Christian J. Hosbach, Allen Park, MI (US); Mandeep Singh Sidhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/275,368

(22) Filed: May 12, 2014

(65) Prior Publication Data

US 2015/0321614 A1    Nov. 12, 2015

(51) Int. Cl.
*B60N 2/68* (2006.01)
*B60R 7/00* (2006.01)

(52) U.S. Cl.
CPC .............. *B60N 2/686* (2013.01); *B60N 2/68* (2013.01); *B60R 7/005* (2013.01); *B60N 2205/35* (2013.01)

(58) Field of Classification Search
CPC ........... B60N 2/686; B60N 7/005; B60N 2/68
USPC .......................... 297/188.04, 188.07, 188.06
See application file for complete search history.

(56) References Cited

U.S. PATENT DOCUMENTS

| | | | | |
|---|---|---|---|---|
| 5,295,732 A | * | 3/1994 | Boisset | B60N 2/70 297/188.04 |
| 5,863,092 A | * | 1/1999 | Kifer | B60R 7/043 211/12 |
| 2004/0012237 A1 | * | 1/2004 | Horiki et al. | 297/440.11 |
| 2004/0129585 A1 | * | 7/2004 | Ballantine et al. | 206/308.1 |
| 2005/0248189 A1 | * | 11/2005 | Prasatek et al. | 297/188.04 |
| 2008/0252111 A1 | | 10/2008 | Rothkop et al. | |
| 2014/0062147 A1 | * | 3/2014 | Bashir | B60R 7/005 297/188.01 |

FOREIGN PATENT DOCUMENTS

| | | |
|---|---|---|
| DE | 102010024544 A1 | 12/2011 |
| DE | 102012011226 A1 | 12/2012 |
| GB | 2430420 B | 3/2009 |

* cited by examiner

*Primary Examiner* — Syed A Islam
(74) *Attorney, Agent, or Firm* — Vichit Chea; Price Heneveld LLP (57) ABSTRACT

A vehicle seating assembly includes a seatback defining a cavity generally accessible via a slot disposed on a back panel of the seatback. A plurality of cover members extend over the cavity and operate between a flexed position and an unflexed position. The plurality of cover members are substantially flush with a planar portion of the back panel in the unflexed position. An elastic member is disposed on an inner-surface of the back panel proximate the plurality of cover members. The elastic member and the cover members define a pocket. The elastic member is configured to expand into the cavity, thereby expanding the pocket.

12 Claims, 8 Drawing Sheets

INTERNAL MAP POCKET

FIELD OF THE DISCLOSURE

The present disclosure generally relates to a vehicle map pocket, and more particularly relates to a map pocket disposed within a vehicle seatback.

BACKGROUND OF THE DISCLOSURE

Storage within a passenger compartment of a vehicle is desired by occupants because it permits them easy access to stowed items. It is generally understood that one location for vehicle storage is on the backside of the driver and passenger seating assemblies. Typically, these storage compartments are known as map pockets and are configured to hold paper maps and other vehicle related items. Traditional storage compartments can be unsightly and can occupy cabin space intended for use by occupants of the vehicle. Therefore, it is becoming desirable to implement new methods of storage within the vehicle.

SUMMARY OF THE DISCLOSURE

According to one aspect of the present disclosure, a vehicle seating assembly includes a seatback defining a cavity generally accessible via a slot disposed on a back panel of the seatback. A plurality of cover members extend over the cavity and operate between a flexed position and an unflexed position. The plurality of cover members are substantially flush with a planar portion of the back panel in the unflexed position. An elastic member is disposed on an inner-surface of the back panel proximate the plurality of cover members. The elastic member and the cover members define a pocket. The elastic member is configured to expand into the cavity, thereby expanding the pocket.

According to another aspect of the present disclosure, a vehicle seating assembly includes a seatback having a front passenger support and a back panel having an elastic member disposed along an inner-surface thereof. The elastic member and the back panel define a pocket between the front passenger support and the hard back panel. A slot is by a plurality of cover members integrally formed in the back panel. The cover members are configured to flex outwardly to secure an object between the elastic member and the back panel.

According to yet another aspect of the present disclosure, a vehicle seating assembly includes a seatback defining an inner cavity. A back panel of the seatback includes a cover member. An elastic member is disposed on an inner-surface of the back panel. The elastic member and the back panel define a pocket. The cover member is configured to flex into the seatback to expand the elastic member into the inner cavity.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 1A:
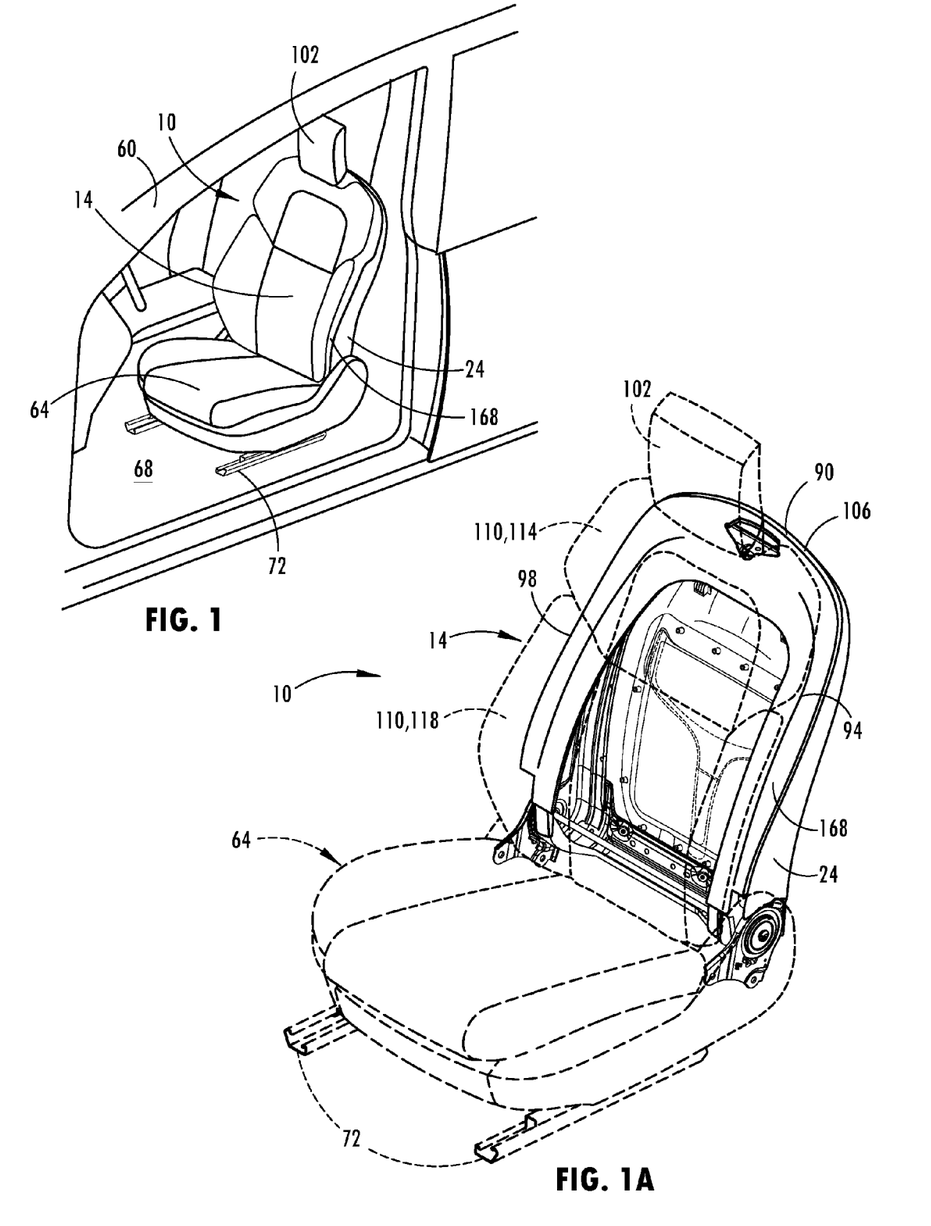
FIG. 1 is a top perspective view of one embodiment of the present disclosure disposed in a seating assembly within a vehicle.
FIG. 1A is a top perspective view of the seating assembly of FIG. 1 showing a support structure of a seatback, a front passenger support, and a head restraint shown in dashed lines.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12, reference numeral 10 generally designates a vehicle seating assembly including a seatback 14 defining a cavity 18 generally accessible via a slot 22 disposed on a back panel 24 of the seatback 14. A plurality of cover members 28 extend over the cavity 18 and are operable between a flexed position and an unflexed position. The plurality of cover members 28 are substantially flush with a planar portion 32 of the back panel 24 in the unflexed position. An elastic member 36 is disposed on an inner-surface 40 of the back panel 24 proximate the plurality of cover members 28. The elastic member 36 and the cover members 28 define a pocket 44. The elastic member 36 is configured to expand into the cavity 18, thereby expanding the pocket 44.

Referring now to FIG. 1, the vehicle seating assembly 10 is positioned in a driver side location of a vehicle 60. The vehicle seating assembly 10 includes a seat bottom 64 that is pivotally coupled with the seatback 14 for pivotally adjusting the seatback 14 between upright and reclined positions relative to the seat bottom 64. The seat bottom 64 is slidably coupled with a floor 68 of the vehicle 60 upon a track assembly 72. The track assembly 72 is configured to allow the vehicle seating assembly 10 to adjust in a forward and rearward direction relative to the floor 68 of the vehicle 60. It is contemplated that the vehicle seating assembly 10 may be positioned in various positions throughout the vehicle 60 other than the illustrated location, such as a passenger side location, a mid-row location, and a rear seat location. It is also contemplated that the vehicle seating assembly 10 may not include the reclining feature and may not include the track assembly 72, such that the vehicle seating assembly 10 may be fixedly, or alternatively, coupled with the floor 68 of the vehicle 60.

With reference to FIG. 1A, the seatback 14 includes a support structure 90, which has a first side member 94 and a second side member 98, each pivotally coupled with a rear portion of the seat bottom 64. A head restraint 102 is coupled with and supported by a top member 106 of the support structure 90 and is positioned centrally between the first and second side members 94, 98. A passenger support 110 extends forward from the support structure 90 and includes an upper support component 114 and a lower support component 118 for supporting an upper and lower back of an occupant, respectively. The upper support component 114 is configured to pivot forward relative to the support structure 90 and the lower support component 118 statically couples with the support structure 90. It is contemplated that the upper support component 114 may also be static relative to the support structure 90. It is also contemplated that the upper and lower support components 114, 118 of the passenger support 110 may be a single integral component that extends forward from the support structure 90. Further, it is contemplated that the head restraint 102 may be integrated with the lower support component 118 or that the head restraint 102 may otherwise not be included on the vehicle seating assembly 10.

Figure 2:
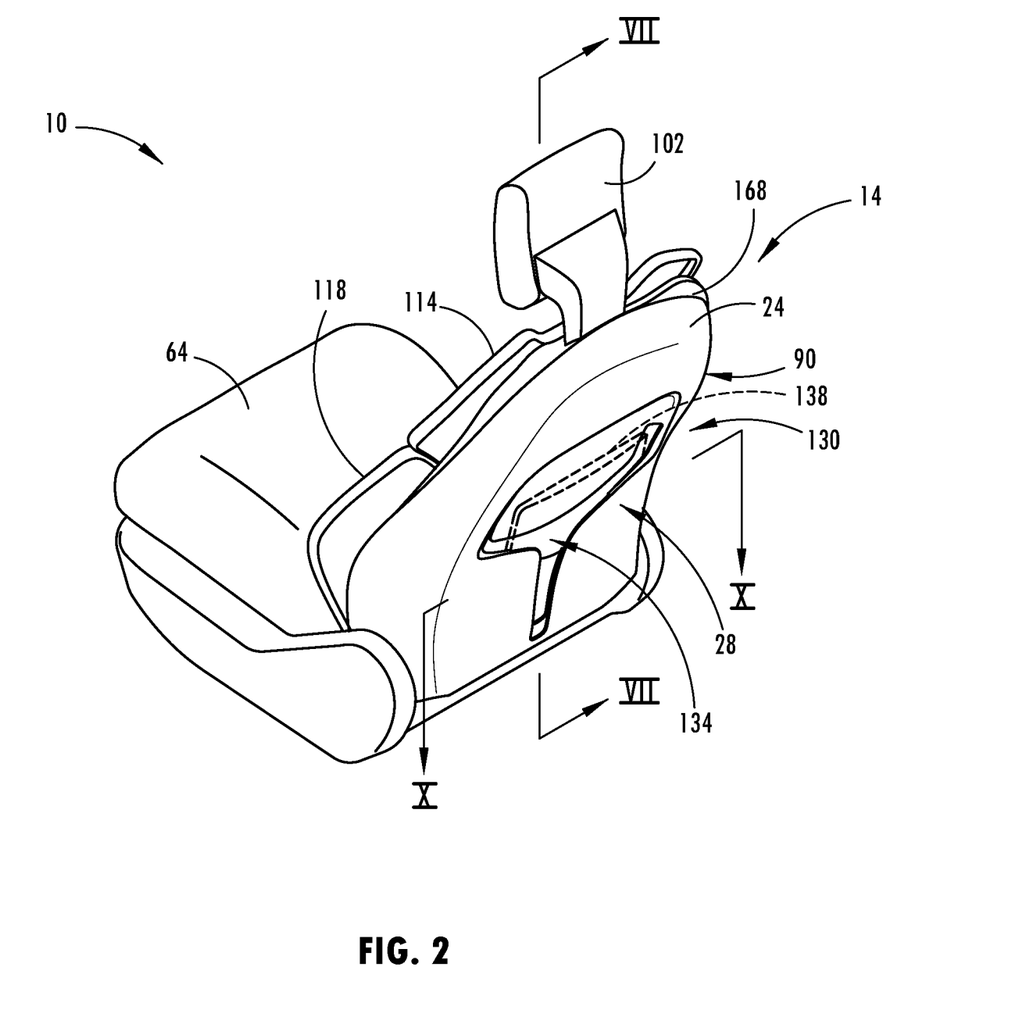
FIG. 2 is a rear perspective view of the seating assembly of FIG. 1 showing the support structure having a back panel and a map pocket assembly.

As illustrated in FIG. 2, the support structure 90 of the seatback 14 includes the back panel 24. The back panel 24 wraps around the rear of the seatback 14, extending from an outboard portion of the seatback 14 to an inboard portion of the seatback 14. Located on the rear side of the seatback 14 is a map pocket assembly 130 which is accessible by occupants of the vehicle 60. The map pocket assembly 130 includes the elastic member 36 (FIG. 3), the cover members 28, the pocket 44 (FIG. 8A), and an opening 134. The map pocket assembly 130 allows occupants to stow a variety of items in the pocket 44 that would otherwise be unsecured within the vehicle 60. The map pocket assembly 130 is depicted as stowing an object 138 which is partially protruding from the opening 134. In the depicted configuration, the object 138 is a paper map, but the object 138 may be a variety of items including magazines, books, electronic devices, children's toys, and automotive related items. It should be understood that the map pocket assembly 130 is also capable of retaining multiple objects 138. With limited space available within the vehicle 60, the map pocket assembly 130 efficiently utilizes existing space without interfering with occupant leg room. The back panel 24 is molded of a rigid polymeric material, but can also be composed of a flexible polymer, fabrics, and other materials. Accordingly, the back panel 24 may be hard, soft, or flexible.

Figure 3:
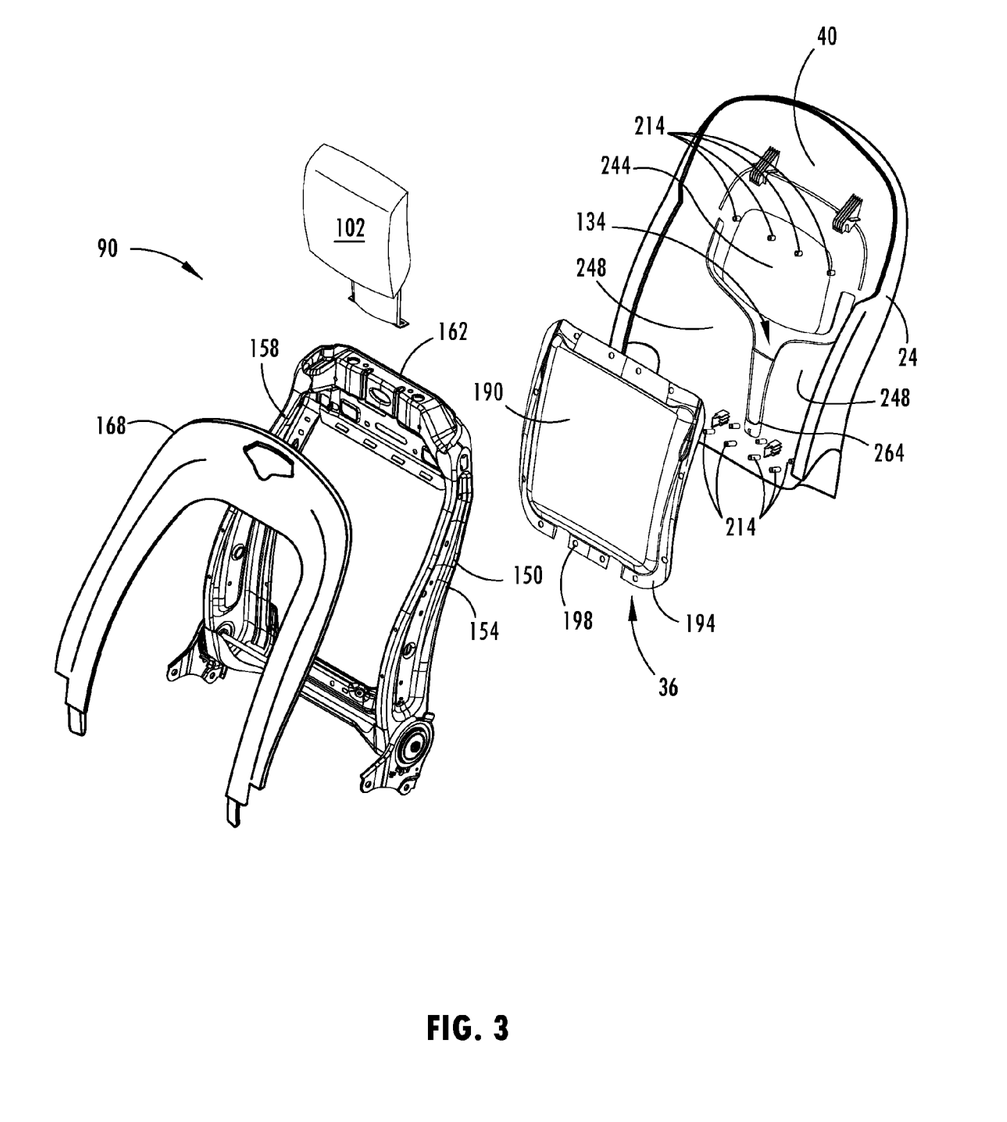
FIG. 3 is an exploded top perspective view of the support structure of the seatback.

Referring now to FIG. 3, an internal seat frame 150 of the support structure 90 in the illustrated embodiment includes a first frame member 154 and a second frame member 158 extending upward from the pivotal connection with recliner brackets that attach to the seat bottom 64 (FIG. 1A). The first and second frame members 154, 158 are substantially parallel with each other and curve upward and rearward from the recliner brackets to provide a curved shape that is similar to the spinal column of an occupant. Further, the first and second frame members 154, 158 are more robust proximate the recliner brackets and taper as they extend upward to couple with a top frame member 162 that extends orthogonally between the first and second frame members 154, 158 to support the head restraint 102. Accordingly, the first and second side members 94, 98 (FIG. 1A) of the overall support structure 90 include the first and second frame members 154, 158, respectively, and the top member 106 (FIG. 1A) includes the top frame member 162. An inner closeout panel 168 and the back panel 24 engage to substantially enclose the internal seat frame 150 and are shown exploded away from the internal seat frame 150. The inner closeout panel 168 and the back panel 24 substantially enclose the first and second frame members 154, 158 such that the cavity 18 (FIG. 8A) is defined generally in the center of the support structure 90 of the seatback 14.

With reference to the embodiment shown in FIGS. 2 and 3, the elastic member 36 of the map pocket assembly 130 is joined along the inner-surface 40 of the back panel 24 and is depicted as exploded away from the back panel 24. The elastic member 36 includes a pocket portion 190 surrounded by an attachment flange 194. The attachment flange 194 defines a plurality of attachment holes 198 utilized for joining the elastic member 36 to the back panel 24. The elastic member 36 is generally square in shape, but may be a variety of shapes including circular, oval, rectangular, triangular, and trapezoidal. The pocket portion 190 is recessed in a vehicle forward direction with respect to the attachment flange 194, but can also be planar with the attachment flange 194.

Referring again to FIG. 3, the elastic member 36 is composed of an elastic material, which permits the elastic member 36 to expand under the application of force and contract when the force is removed. Exemplary elastic materials include spandex, latex, polyisoprene, styrene-butadiene copolymer, acrylonitrile butadiene, rubber, choloroprene, polysiloxane, combinations thereof, and other elastic materials. In some embodiments, the elastic member 36 is a continuous shaped piece of the elastic material. In other embodiments, the elastic member 36 is a fabric composed of elastic material fibers. In additional embodiments, the elastic member 36 is a cloth fabric having elastic material fibers woven into the fabric such that the fabric can stretch. The elastic member 36 is sufficiently durable to resist puncture when the object 138 has sharp edges.

The attachment flange 194 of the elastic member 36 surrounds the opening 134 defined by the back panel 24 such that the pocket portion 190 is disposed over the opening 134. Spaced around the opening 134 is a plurality of cylindrical bosses 214 integrally protruding into the seatback 14. The cylindrical bosses 214 are sized such that the attachment holes 198 defined by the attachment flange 194 of the elastic member 36 may fit over the cylindrical bosses 214. The elastic member 36 is joined to the inner-surface 40 of the back panel 24 via heat staking, adhesives, etc., of the bosses 214 to the holes 198. In some embodiments, the attachment flange 194 and the inner-surface 40 may not incorporate the respective holes and cylindrical bosses 198, 214, but instead may be joined via hot plate welding, laser welding, vibration welding, mechanical fastening, or other joining methods.

The joining of the elastic member 36 to the inner-surface 40 defines the pocket 44 (FIGS. 7-11) between the pocket portion 190 and the inner-surface 40 of the back panel 24. The attachment flange 194 is sufficiently joined to the inner-surface 40 such that the object 138, when in the pocket 44, does not fall into the cavity 18 of the support structure 90.

Figure 4:
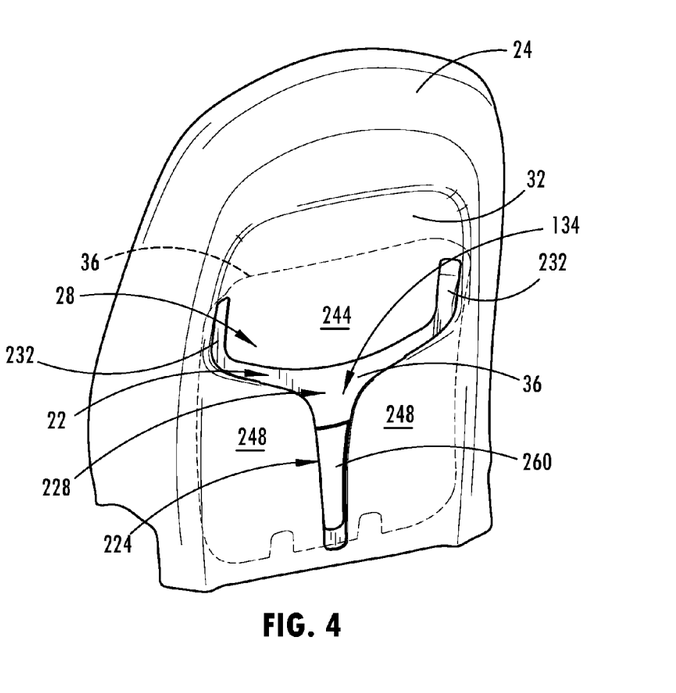
FIG. 4 is a rear perspective view of another embodiment of a back panel of the seatback.

Referring now to FIG. 4, the planar portion 32 is recessed on the back panel 24 of the support structure 90 and defines the opening 134. The opening 134 includes the slot 22, an elongate opening 224, and a junction 228 between the slot 22 and the elongate opening 224. The slot 22 allows vehicle occupants to access the pocket 44 (FIG. 8A) of the map pocket assembly 130 to stow one or more objects 138. The slot 22 is substantially horizontal with respect to the support structure 90 and extends along the width of the planar portion 32. The slot 22 includes two slits 232, each extending upwardly at inboard and outboard ends of the slot 22. The slits 232 extend substantially equal distances up the back panel 24 and are substantially the same width as the slot 22. In some embodiments, the slits 232 may be different lengths or widths than one another. In other embodiments, the width of the slits 232 may be thinner or thicker than the width of the slot 22. In additional embodiments, the slot 22 may include more or less than two slits 232. For example, a single slit 232 can be positioned at the inboard end of the slot 22, or a third slit 232 can be included proximate an intermediate portion of the slot 22. The slits 232 extend vertically along the planar portion 32 of the back panel 24 to the joining area of the inner-surface 40 of the back panel 24 and the attachment flange 194 of the elastic member 36.

With reference again to FIG. 4, the planar portion 32 of the seatback 14 partially defines the elongate opening 224, which forms part of the slot 22 at the junction 228. The junction 228 is located about an intermediate portion of the slot 22 and is substantially configured as a T-junction. The elongate opening 224 extends vertically downward from the junction 228 and terminates above the joining area of the attachment flange 194 (FIG. 3) and inner-surface 40 (FIG. 3). In some embodiments, the junction 228 and the elongate opening 224 are not disposed about an intermediate portion of the slot 22, but rather are located closer to either of the slits 232. In other embodiments, there may be more than one elongate opening 224 and junction 228. For example, elongate openings 224 can extend downwardly at the inboard and outboard ends of the slot 22 below the slits 232.

The opening 134 substantially divides the planar portion 32 of the back panel 24 into the plurality of cover members 28, as depicted in FIG. 4. The cover members 28 have rounded edges and are integrally formed from the planar portion 32 of the back panel 24. The cover members 28 extend over the cavity 18 of the support structure 90 and the elastic member 36 to define the pocket 44. In some embodiments, the opening 134 can divide the planar portion 32 into more or less than three cover members 28 and a variety of shapes, depending on the number and/or configuration of the slits 232 and the elongate opening(s) 224. The cover members 28 include an upper cover member 244 and two lower cover members 248. The upper cover member 244 is defined by the opening 134 above the slot 22 and between the slits 232. In some embodiments, the slot 22 can include more than two slits 232, thereby defining more than one upper cover member 244. The upper cover member 244 is separated from the lower cover members 248 by the slot 22. The two lower cover members 248 are substantially separated by the elongate opening 224 onto inboard and outboard portions of the planar portion 32.

Referring again to FIG. 4, the opening 134 sufficiently detaches the cover members 28 from one another so that the cover members 28 may independently flex relative to one another. The polymeric material of the back panel 24 is sufficiently flexible to allow the cover members 28 to flex inwardly and outwardly relative to the planar portion 32 of the back panel 24. The flexibility offered by the cover members 28 provides easier access to the pocket 44 of the map pocket assembly 130 for the occupants. In some embodiments, the back panel 24 may be thinner in the planar portion 32 than the rest of the seatback 14 such that the cover members 28 have a greater flexibility than the rest of the back panel 24. In additional embodiments, the planar portion 32 and/or the cover members 28 may be composed of a different polymeric material which permits greater flexibility than the rest of the back panel 24.

As illustrated in FIG. 4, the elongate opening 224 between the lower cover members 248 is spanned by a webbing 260. The webbing 260 extends the length of the elongate opening 224 and may extend partially into the slot 22. The webbing 260 is secured to the lower cover members 248 via a lip 264 (FIG. 3) that extends substantially around an edge of the elongate opening 224. The webbing 260 is composed of an elastic material that permits the lower cover members 248 to flex independently of one another. The webbing 260 is composed of the same material as the elastic member 36, but may also be any of the above-noted elastic materials listed in connection with the elastic member 36. The webbing 260 is constructed in a similar manner as described for the elastic member 36 above. The webbing 260 prevents objects 138 stowed in the pocket 44 of the map pocket assembly 130 from falling out between the lower cover members 248. The elastic material of the webbing 260 also creates an elastic force to return the lower cover members 248 to an unflexed and flush orientation with the planar portion 32 after flexing. In some embodiments, the webbing 260 is not a continuous piece of elastic material, but rather a netting of elastic material. In additional embodiments, the elongate opening 224 may not include the webbing 260.

Figure 5:
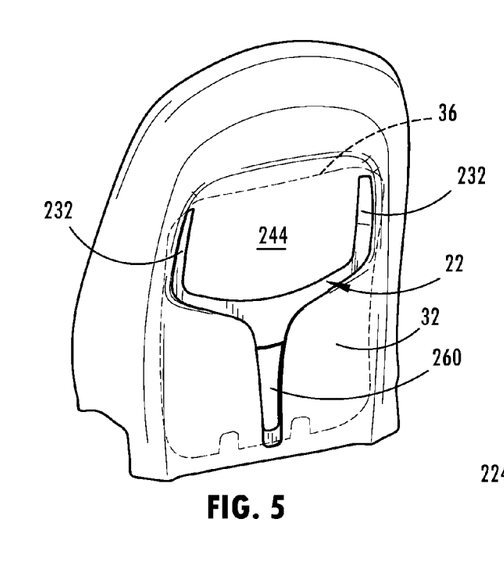
FIG. 5 is a rear perspective view of the back panel of the seatback according to yet another embodiment.

An alternate embodiment of the map pocket assembly 130 having a larger upper cover member 244 is depicted in FIG. 5. In the depicted configuration, the slits 232 extending vertically from the slot 22 are longer and thinner than that of the previously depicted embodiment (see FIG. 4). The slits 232 are thinner than the slot 22 and have sufficient length to define the upper cover member 244 as substantially square or rectangular in shape. By extending the length of the slits 232 and the upper cover member 244, more storage space is provided between the upper cover member 244 and the elastic member 36. The larger area of the upper cover member 244 and the thinner slits 232 can aid in stowing and retaining objects 138 of different sizes and shapes in the pocket 44 as compared to the previous embodiment.

Figure 6:
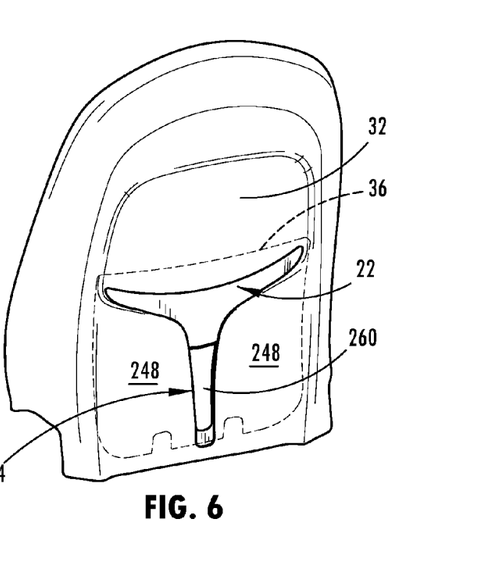
FIG. 6 is a rear perspective view of the back panel of the seatback according to still another embodiment.

Referring now to FIG. 6, another embodiment of the map pocket assembly 130 is depicted. In the current configuration, the planar portion 32 of the back panel 24 does not include the upper cover member 244. The slot 22 extends the width of the planar portion 32, but does not include the vertically extending slits 232. The elongate opening 224 extends downwardly from the junction 228 at an intermediate portion of the slot 22. The elastic member 36 is joined to the inner-surface 40 (FIG. 3) of the back panel 24 surrounding the slot 22 and the elongate opening 224. The elongate opening 224 includes the webbing 260 and permits the lower cover members 248 to independently flex in a like manner as described above. This embodiment permits material costs to be conserved because the elastic member 36 covers a smaller portion of the back panel 24. Resources may also be conserved in manufacturing from the relatively less complex design.

Figures 7, 7A:
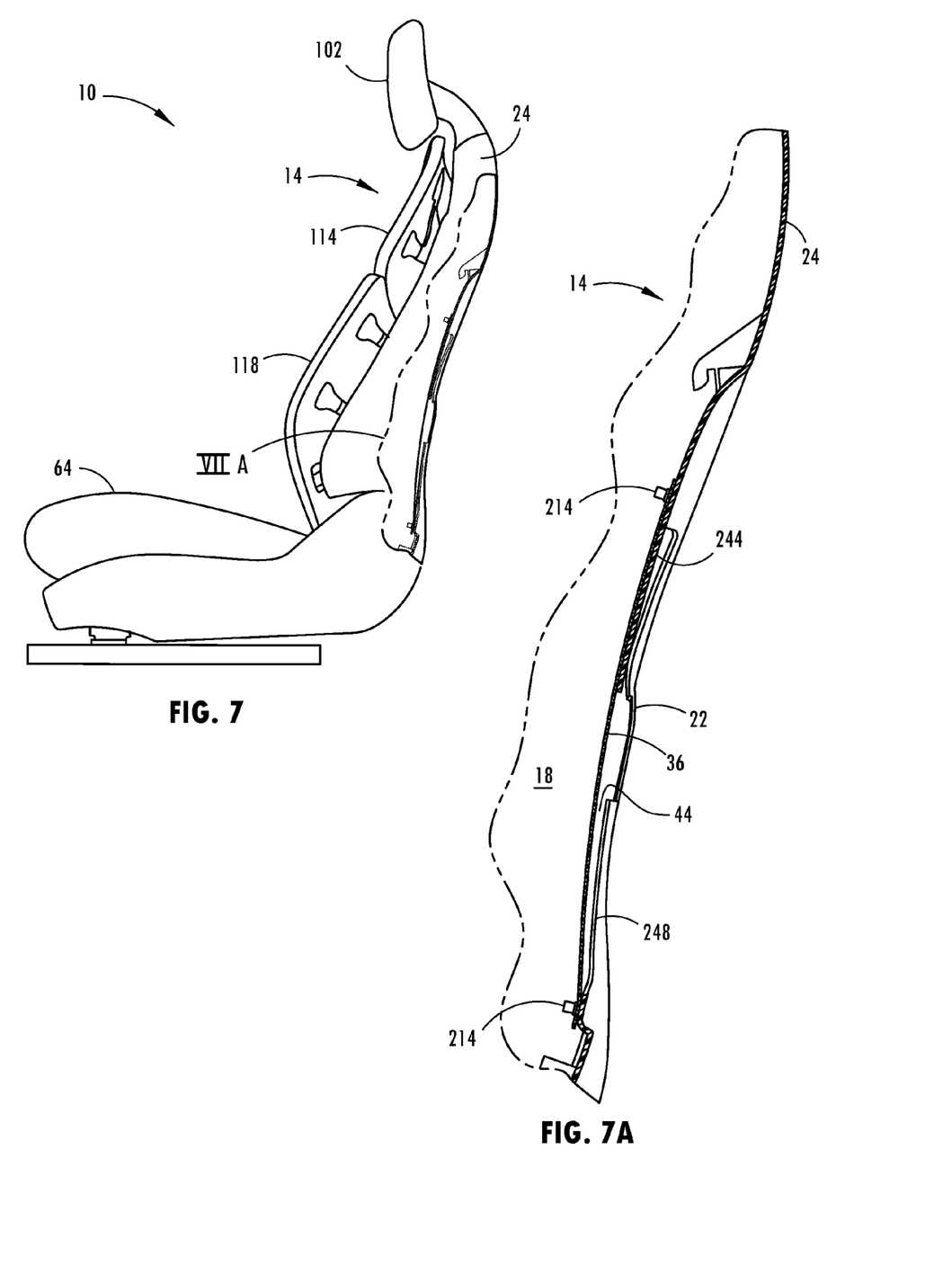
FIG. 7 is a side elevational view of the seatback having an upper cover member and lower cover members in an unflexed position.
FIG. 7A is an enlarged cross-sectional view of the seatback of area VIIA of FIG. 7.

Referring now to FIGS. 7 and 7A, the map pocket assembly 130 is depicted with the upper cover member 244 in the unflexed position and the pocket 44 in the unexpanded configuration. While in the unflexed position, the upper cover member 244 is substantially flush with the lower cover members 248 and the planar portion 32 of the back panel 24. In the unexpanded configuration, the elastic member 36 is in close proximity with the cover members 28 and the inner-surface 40 of the back panel 24. As depicted, the elastic member 36 does not substantially protrude into the cavity 18 of the seatback 14 and the pocket 44 has a nominal volume in the unexpanded configuration. Objects 138 with nominal thickness may be stowed in the pocket 44 while in the unexpanded configuration. Such objects 138 may include documents, photos, and paper directions.

Figures 8, 8A:
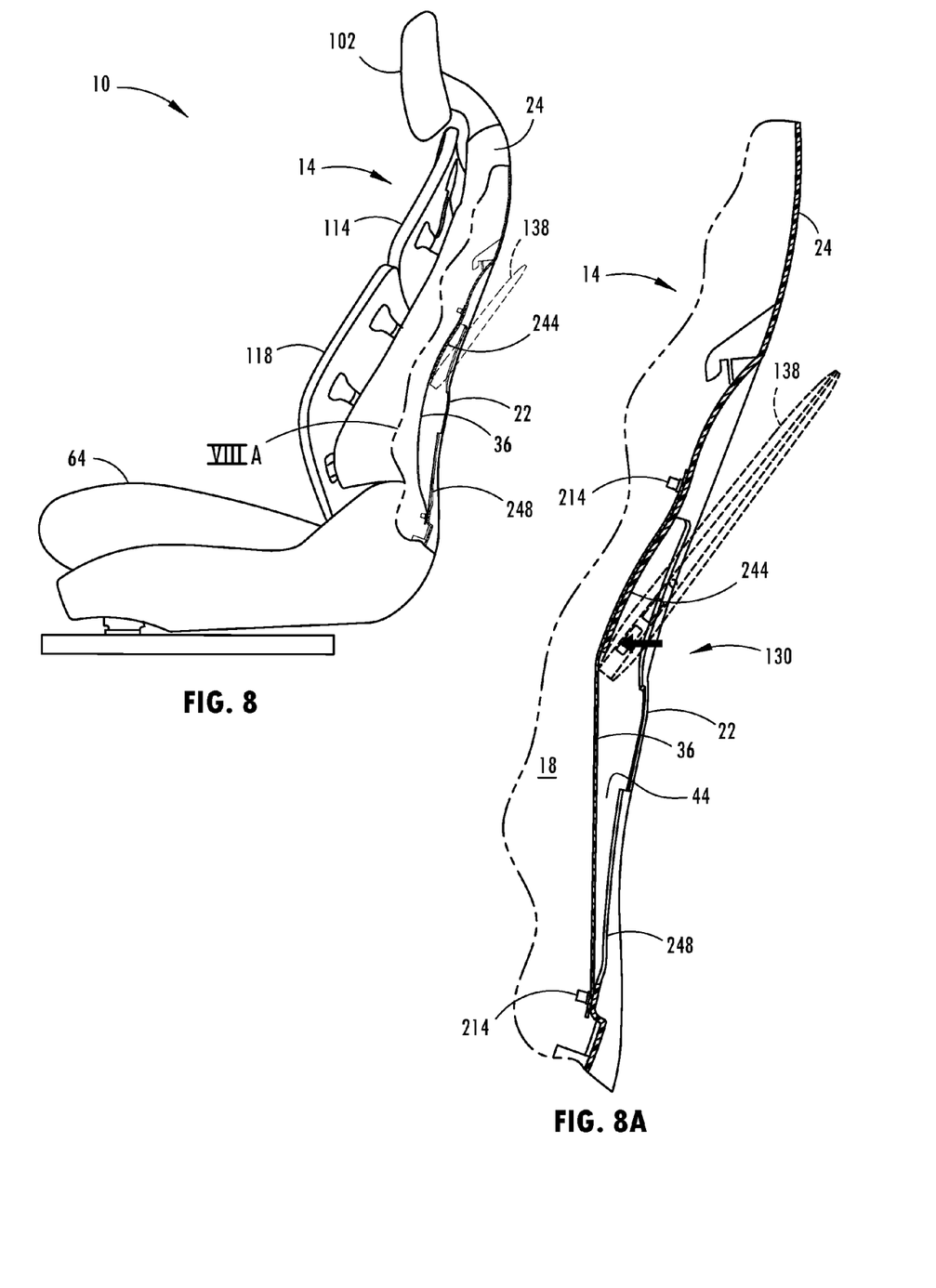
FIG. 8 is a side elevational view of the seatback having the upper cover member in a flexed position.
FIG. 8A is an enlarged cross-sectional view of the seatback of area VIIIA of FIG. 8.

Referring now to FIGS. 8 and 8A, the upper cover member 244 is depicted in the flexed position with the elastic member 36 in the expanded configuration. The elastic member 36 is configured to expand into the cavity 18 by moving the upper cover member 244 from the unflexed position (FIGS. 7 and 7A) to the flexed position. To expand the elastic member 36, the vehicle occupant applies a force to the upper cover member 244 in a vehicle forward direction. The force may be applied via an appendage of the occupant or the occupant can push the object 138 against the upper cover member 244. In the depicted embodiment, the object 138 is a portable computing device, such as a laptop computer or a tablet. As the force is applied by the occupant, the upper cover member 244 pivots from the unflexed position to the flexed position within the support structure 90 of the seatback 14. The connection between the upper cover member 244 and the planar portion 32 serves as a living hinge for the upper cover member 244 to pivot around. In the flexed position, the upper cover member 244 makes contact with the pocket portion 190 of the elastic member 36. The contact between the upper cover member 244 and the pocket portion 190 causes the elastic member 36 to expand in a vehicle forward direction into the cavity 18. The expansion of the elastic member 36 into the cavity 18 causes the pocket 44 to increase in storage volume. In the unexpanded configuration of the elastic member 36, the pocket 44 has a volume of between about 0.1 and about 0.4 liters. In the expanded configuration of the elastic member 36, the pocket 44 has a volume of between about 0.8 and about 1.2 liters. With the upper cover member 244 in the flexed position and the elastic member 36 in the expanded configuration, the occupant can place the object 138 in the pocket 44.

Figure 9:
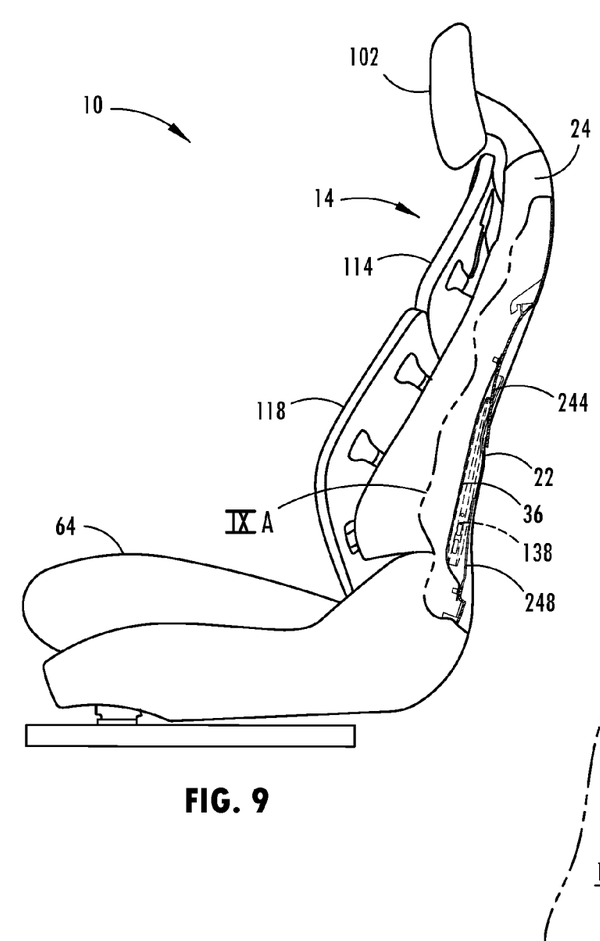
FIG. 9 is a side elevational view of the seatback having the upper cover member in a outwardly flexed position.
Figure 9A:
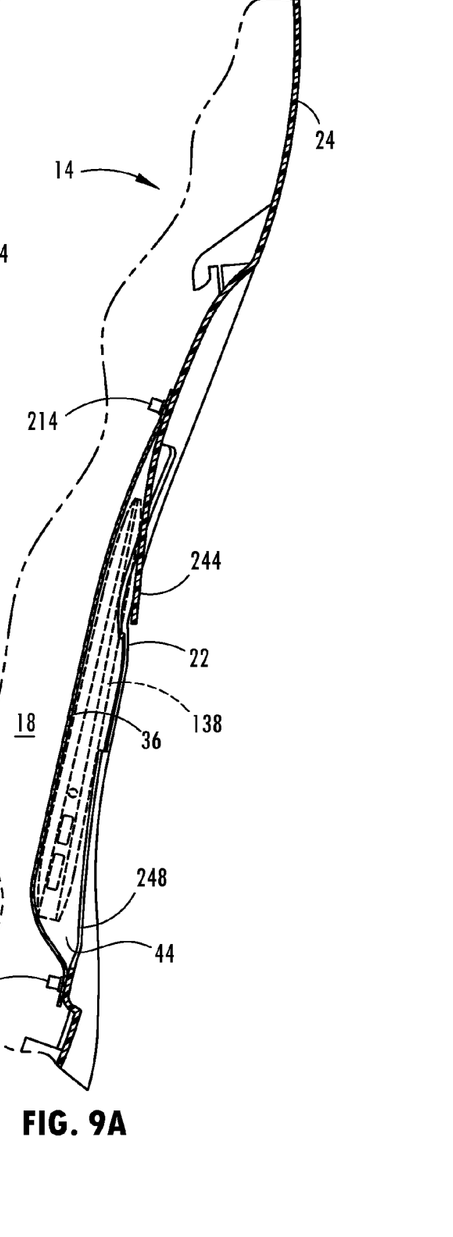
FIG. 9A is an enlarged cross-sectional view of the seatback of area IXA of FIG. 9.

Referring again to FIGS. 8 and 8A, after the object 138 has been placed within the pocket 44, the occupant can remove the applied force and allow the upper cover member 244 to return to the unflexed position (FIGS. 7 and 7A). After removal of the force applied by the occupant, the elastic member 36 and the polymeric material of the back panel 24 exert an elastic force to return the upper cover member 244 to the unflexed position. As the upper cover member 244 returns to the unflexed position, the elastic member 36 begins to contract to its unexpanded configuration. The contraction of the elastic member 36 exerts force on the object 138 in the pocket 44 such that the object 138 is securely held in place against the lower cover members 248 (FIGS. 9 and 9A). The webbing 260 (FIG. 4) permits the lower cover members 248 to independently flex to accommodate a variety of different shaped objects 138 in the pocket 44. In instances where the object 138 is taller than the lower cover members 248, the object 138 may protrude from the slot 22, but still remain substantially retained by the map pocket assembly 130.

Referring now to FIGS. 9 and 9A, the upper cover member 244 not only flexes into the seatback 14, but can also be flexed outwardly from the seatback 14 in a vehicle rearward direction. Flexing the upper cover member 244 vehicle rearward allows substantially all of the available space in the pocket 44 to be utilized. The occupant of the vehicle 60 can pull the upper cover member 244 vehicle rearward to separate the upper cover member 244 from the elastic member 36. The occupant may then place the object 138, depicted here again as an electronic device, between the upper cover member 244 and the elastic member 36. As the occupant releases the applied force, the upper cover member 244 substantially returns to the unflexed position and the elastic member 36 expands into the cavity 18 to accommodate the object 138. The elastic member 36 then securely holds the object 138 against the upper and lower cover members 244, 248 internal to the seatback 14. The described storage feature is particularly useful in storing tall and fragile objects 138, such as a laptop computer, which the vehicle occupants do not wish to protrude from the map pocket assembly 130. One advantage derived from this use of the map pocket assembly 130 is that the rigid polymeric material of the upper cover member 244 can protect the object 138 from damage. In some embodiments, the upper cover member 244 and the lower cover members 248 can have a soft lining on areas anticipated to contact the retained object 138.

Figure 10:
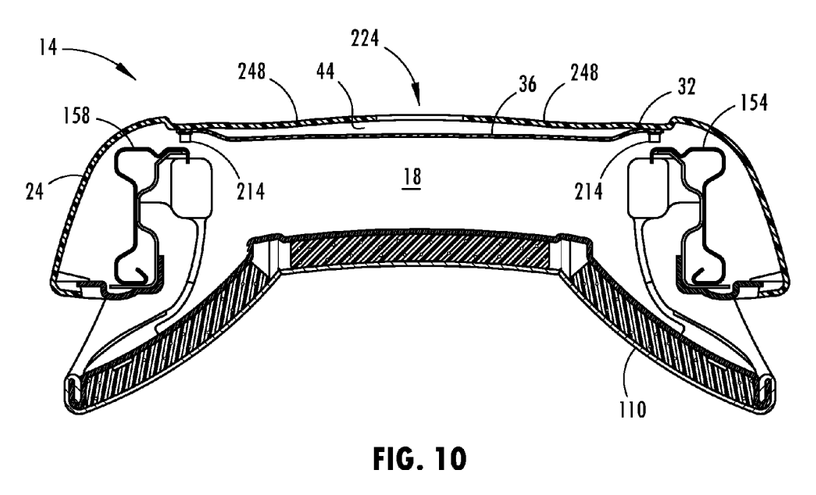
FIG. 10 is a cross-sectional view of the seatback having the lower cover members in the unflexed position, taken at line X-X of FIG. 2.
Figure 11:
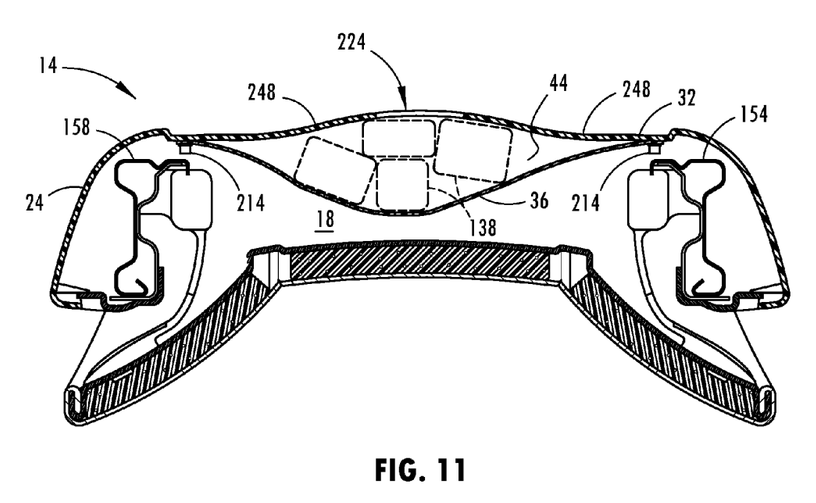
FIG. 11 is a cross-sectional view of the seatback of FIG. 10 having multiple objects in the pocket.

As illustrated in FIGS. 10 and 11, the pocket 44 of the map pocket assembly 130 can further be expanded by flexing the lower cover members 248 of the back panel 24 outwardly. The lower cover members 248 rest in an unflexed position (FIG. 10) which is substantially flush with the upper cover member 244 (FIG. 7A) and the planar portion 32 of the back panel 24. In the depicted configuration, the lower cover members 248 are in substantial proximity to the elastic member 36. The vehicle occupant can expand the pocket 44 by pulling the lower cover members 248 vehicle rearward to the flexed position. With the lower cover members 248 in the flexed position, the object 138 or multiple objects 138 can be placed in the pocket 44 and the rearward force released. When the force is released, the lower cover members 248 will return toward the unflexed position in a substantially similar manner to that of the upper cover member 244. As depicted in FIG. 11, the return of the lower cover members 248 causes the objects 138 to be pushed into the elastic member 36, thereby expanding the elastic member 36 into the cavity 18. As the elastic member 36 is expanded, it exerts an elastic force on the objects 138 in the pocket 44 such that the objects 138 are securely held between the elastic member 36 and the lower cover members 248 of the back panel 24. The webbing 260, which spans the elongate opening 224, prevents the objects 138 from being pushed from the pocket 44 by the elastic member 36. The lower cover members 248 allow the map pocket assembly 130 to secure multiple differently shaped objects 138 because the lower cover members 248 can independently flex to substantially conform to the shapes of the objects 138. The lower cover members 248, when retaining the objects 138 in the pocket 44, do not substantially flex outwardly from the seatback 14 and interfere with the leg room of a vehicle occupant.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly, comprising:
   a seatback defining a cavity between a front passenger support and a hard back panel, the cavity being generally accessible via a slot disposed on the hard back panel of the seatback;
   a plurality of cover members extending over the cavity and operable between a flexed position and an unflexed position, wherein the plurality of cover members are spaced a predetermined distance from one another and are substantially flush with a planar portion of the back panel in an unflexed position, and wherein the plurality of cover members are each independently operable between the flexed and unflexed positions;
   a webbing extending between the plurality of cover members; and
   an elastic member disposed on an inner-surface of the back panel proximate the plurality of cover members, the elastic member, the plurality of cover members, and the webbing together defining a pocket, wherein the elastic member is configured to expand into the cavity defined between the front passenger support and the hard back panel, thereby expanding the pocket.

2. The vehicle seating assembly of claim 1, wherein the plurality of cover members include an upper cover member and two lower cover members.

3. The vehicle seating assembly of claim 2, wherein the upper cover member is configured to expand the elastic member into the cavity when the upper cover member moves to the flexed position.

4. The vehicle seating assembly of claim 2, wherein the two lower cover members extend away from the seatback when in the flexed position.

5. The vehicle seating assembly of claim 1, wherein the two lower cover members generally define a vertically extending slot.

6. A vehicle seating assembly, comprising:
   a seatback including a front passenger support and a back panel defining an interior space therebetween;
   an elastic member disposed in the interior space and defining a pocket between the front passenger support and the back panel; and
   a Y-shaped slot defined by a plurality of cover members integrally formed in the back panel, the plurality of cover members being outwardly flexible to secure an object in the pocket, wherein the plurality of cover members include an upper cover member and two lower cover members, and wherein a webbing spans an elongate opening between the two lower cover members.

7. The vehicle seating assembly of claim 6, wherein the plurality of cover members are each independently flexible.

8. The vehicle seating assembly of claim 6, wherein the webbing is composed of substantially the same elastic material as the elastic member.

9. The vehicle seating assembly of claim 6, wherein the upper cover member is configured to flex into the seatback.

10. A vehicle seating assembly, comprising:
    a seatback defining an inner cavity;
    a back panel of the seatback having an upper cover member and two lower cover members;
    a webbing extending across a vertical slot between the two lower cover members;
    an elastic member disposed on an inner-surface of the back panel; and
    a pocket defined between the elastic member and the upper and lower cover members and expandable into the inner cavity.

11. The vehicle seating assembly of claim 10, wherein the upper and lower cover members are integrally formed from the back panel.

12. The vehicle seating assembly of claim 10, wherein the upper and lower cover members are also configured to flex inwardly from the seatback.

* * * * *